United States Patent
Schuermann

(10) Patent No.: US 9,725,362 B2
(45) Date of Patent: Aug. 8, 2017

(54) METHOD FOR USING THE WASTE HEAT FROM A PLANT FOR PRODUCING CEMENT AND PLANT FOR PRODUCING CEMENT

(71) Applicant: KHD Humboldt Wedag GmbH, Cologne (DE)

(72) Inventor: Heiko Schuermann, Leverkusen (DE)

(73) Assignee: KHD Humboldt Wedag GmbH, Cologne (DE)

( * ) Notice: Subject to any disclaimer, the term of this patent is extended or adjusted under 35 U.S.C. 154(b) by 91 days.

(21) Appl. No.: 14/435,622

(22) PCT Filed: Oct. 10, 2013

(86) PCT No.: PCT/EP2013/071123
§ 371 (c)(1),
(2) Date: Apr. 14, 2015

(87) PCT Pub. No.: WO2014/060275
PCT Pub. Date: Apr. 24, 2014

(65) Prior Publication Data
US 2015/0274591 A1 Oct. 1, 2015

(30) Foreign Application Priority Data
Oct. 17, 2012 (DE) .................. 10 2012 020 300

(51) Int. Cl.
*F27B 7/20* (2006.01)
*C04B 7/47* (2006.01)
(Continued)

(52) U.S. Cl.
CPC .............. *C04B 7/475* (2013.01); *C04B 7/434* (2013.01); *C04B 7/436* (2013.01); *F22B 1/1876* (2013.01);
(Continued)

(58) Field of Classification Search
CPC ........ C04B 7/432; C04B 7/434; B01J 8/0055; F27B 7/2033; F27B 7/2025
(Continued)

(56) References Cited

U.S. PATENT DOCUMENTS 4,071,310 A * 1/1978 Ghestem ................. C04B 7/434
106/750
4,392,353 A * 7/1983 Shibuya ................. B01D 53/50
432/106

(Continued)

FOREIGN PATENT DOCUMENTS

DE 2523794 12/1975
DE 19518926 11/1996

OTHER PUBLICATIONS

International Search Report, Jan. 23, 2014.

*Primary Examiner* — Gregory A Wilson
(74) *Attorney, Agent, or Firm* — Greer, Burns & Crain, Ltd.

(57) ABSTRACT

A method for using waste heat from a cement producing plant, wherein heat of a process gas is used through a heat exchanger, which comprises a sequence of cyclones, for heating raw mix. A cement producing plant having at least one calcinator and at least one heat exchanger, which comprises a series of cyclones for heating raw mix. The process gas is removed at the outlet of the calcinator and/or at the gas-side outlet of the first cyclone in the heat exchanger in the direction of gas flow and, once the heat has been removed in a steam vessel, the cooled process gas is fed back into the second cyclone or third cyclone in the heat exchanger in the direction of gas flow. The heat taken from the process can be used for the further heating of unrecovered heat which can thereby be more efficiently converted into electrical energy.

15 Claims, 2 Drawing Sheets

(51) Int. Cl.
  *F27D 17/00* (2006.01)
  *C04B 7/43* (2006.01)
  *F22B 1/18* (2006.01)

(52) U.S. Cl.
  CPC .......... *F27B 7/2033* (2013.01); *F27D 17/004* (2013.01); *Y02P 40/121* (2015.11); *Y02P 40/123* (2015.11)

(58) Field of Classification Search
  USPC ...... 432/14, 15, 58, 106; 106/705, 709, 739, 106/745; 110/342, 246, 223, 226
  See application file for complete search history.

(56) References Cited

U.S. PATENT DOCUMENTS

| | | | | |
|---|---|---|---|---|
| 4,541,245 A * | 9/1985 | Becker | .................. | C04B 7/43 110/347 |
| 2009/0293303 A1 | 12/2009 | Maestri | | |
| 2014/0087319 A1 * | 3/2014 | Leibinger | ............ | B01D 53/343 432/9 |
| 2014/0174324 A1 * | 6/2014 | Leibinger | ............... | C04B 7/364 106/723 |

\* cited by examiner

METHOD FOR USING THE WASTE HEAT FROM A PLANT FOR PRODUCING CEMENT AND PLANT FOR PRODUCING CEMENT

CROSS-REFERENCES TO RELATED APPLICATIONS

This application claims the benefit of the German patent application No. 10 2012 020 300.4 filed on Oct. 17, 2012, the entire disclosures of which are incorporated herein by way of reference.

BACKGROUND OF THE INVENTION

The invention relates to a method for using the waste heat from a plant for producing cement, wherein heat of a process gas is used for heating water vapor via a heat exchanger, and wherein the plant for producing cement has at least one calcinator and at least one heat exchanger, which consists of a sequence of cyclones, for heating raw meal, and to a plant for producing cement, wherein the plant for producing cement has at least one calcinator and at least one heat exchanger, which consists of a sequence of cyclones, for heating raw meal.

Plants for producing cement generally handle large amounts of heat. In order to use the waste heat of a cement plant efficiently, the waste heat produced in the process is returned to the process via heat exchangers that are distributed in the plant. In the return of the heat, the recovery, it is necessary that the heat is returned to the process at as high a temperature as possible, in order to reduce the necessary input of energy for generating the process heat. However, not all waste heat that is produced in the plant is suitable for recovery. Generally, only those sources of heat that have a temperature well above 300° C. are recovered. Apart from returning the heat to the process, it is also known to use the unrecovered, low-calorific heat for drying raw material or to use it for preparing fuels.

Apart from the preparation of raw material and fuels, it has also become common practice to convert the unrecovered waste heat into electrical energy. In plants for producing cement, essentially two steam boiler systems are known for this. A first system is known as an SP boiler, from the concept of a "Suspension Preheater", and this boiler is arranged downstream of the cyclone heat exchanger that is used in plants for producing cement for the preheating of the raw meal. A second system is known as an AQC boiler, from the concept of an "Air Quenched Clinker Cooler", which is arranged downstream of a plant for producing cement in the exhaust air path of the clinker cooler.

However, on account of the low temperature of the unrecovered waste heat, these known systems for converting waste heat into electrical energy generally have an undesirably low conversion efficiency. This is so because, the higher the temperature of the waste heat, the greater the capacity of a general thermal engine to convert heat into mechanical work, which in turn is converted by a generator into electrical energy.

In order to improve the efficiency in the conversion of unrecovered waste heat into electrical energy in a plant for producing cement, it would consequently be necessary to create a source of waste heat that provides a much higher temperature than is known in known plants for producing cement.

SUMMARY OF THE INVENTION

The object of the invention is therefore to provide a method and a corresponding plant for producing cement in which a source of waste heat of high temperature is available.

According to the invention, it is proposed to remove the process gas from the plant for producing cement at the outlet of the calcinator and/or at the gas-side outlet of the first cyclone in the direction of gas flow in the heat exchanger. Heat is removed from this process gas in a steam boiler, and the process gas cooled in the steam boiler is then returned to the second or third cyclone in the direction of gas flow in the heat exchanger.

Various locations at which hot process gases are available exist in a plant for producing cement. However, not all of these locations can be used as removal points for process gas, because this would disturb the intervention in the process for producing cement. It has surprisingly been found in prolonged series of tests that a removal of hot process gas at the outlet of the calcinator and/or at the gas-side outlet of the first cyclone in the direction of gas flow in the heat exchanger only has little influence on the process for producing cement. When removing an appreciable amount of process heat, it must be expected that, depending on the location of the removal, the preheating of the raw meal is only insufficient, and consequently the calcination reaction in the calcinator does not take place completely. If heat is removed in the calcinator, the calcination reaction could be incomplete, as a result of which the clinker as an intermediate product contains an excessive amount of free lime. Also, as from a certain dew point, salts that are present in the raw meal could fuse together and clog the plant for producing cement. Finally, the graduated combustion carried out in many plants for producing cement could be insufficient, and consequently the plant could emit an excessive amount of NOx. Also, controlled management of the combustion, with alternating reductive and oxidative conditions to avoid CO and NOx emission, could be disturbed by the removal of process heat.

In order to return the process gas removed from the process to the process, it has proven to be advantageous if the cooled process gas is returned to the second or third cyclone in the direction of gas flow in the heat exchanger. According to the invention, therefore, a process gas circulation takes place, seen in the direction of gas flow, at the beginning of the heat exchanger and at the outlet of the calcinator in addition to the process gas flow in the plant.

The process gas at the outlet of the calcinator and/or at the gas-side outlet of the first cyclone in the direction of gas flow in the heat exchanger has great amounts of dust. It is therefore necessary at least partially to remove the dust from the process gas. However, this removed dust is raw material, or partially to completely calcined intermediate product, and can be returned to the process. In order not to cool undesirably the unremoved process gas remaining in the process, in a refinement of the invention it is proposed to pass the separated and also cooled-down dust into a cement mill, where it is ground together with the fully burned clinker. However, it is also possible to charge the dust that is to be returned into the rotary kiln inlet chamber of the rotary kiln, in order to sinter the dust as an intermediate product in the rotary kiln.

In order to control the amount of process gas removed from the process, according to the invention it is proposed to control the amount of gas by way of a control valve or a slide valve or a damper in the gas return, where the process gas is at least partially de-dusted. At this point the process gas is also cooled, thereby obviating the need for problematic control of the amount of gas with hot gas.

The alternative removal of process gas for using the waste heat instead of using the low-calorific waste heat at the end of the heat exchanger or at the end of the clinker cooler allows the low-calorific waste heat to remain. In a particular refinement of the invention it is envisaged for the generation of electrical energy from the steam produced from low-calorific waste heat to heat up this steam, which is actually too cold, with the aid of the hot process gases, in order to increase the temperature of the steam produced with the waste heat from the heat exchanger and the clinker cooler. Heat from the process gas is combined with waste heat that is removed downstream of the heat exchanger on the gas flow side or downstream of the clinker cooler on the material flow side, in that the colder steam as a heat carrier is heated up further by the process gas heated up according to the invention. As a result, the waste heat of the plant for producing cement is used to the greatest possible extent.

BRIEF DESCRIPTION OF THE DRAWINGS

The invention is explained in more detail on the basis of the following figures, in which.

DETAILED DESCRIPTION OF THE PREFERRED EMBODIMENTS

Figure 1:
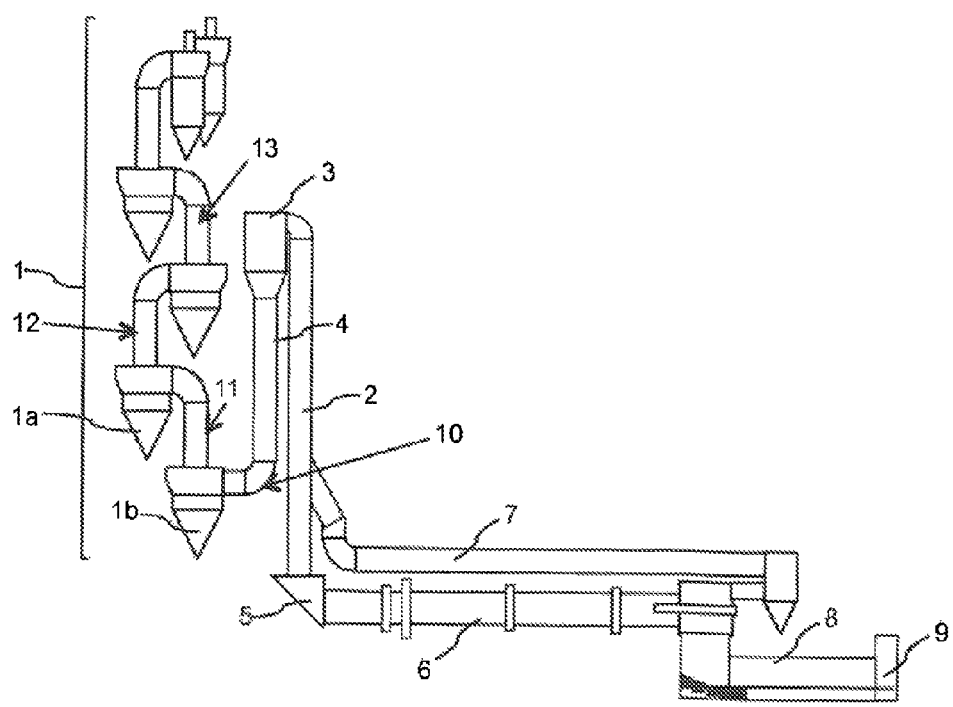
FIG. 1 shows a diagram of a plant of the type in question for producing cement with depicted removal locations for hot process gas according to the invention.

In FIG. 1 there is shown a diagram of a plant of the type in question for producing cement. Even though the structure of different plants differs, the sequence of the essential elements is comparable between various plants. In the plant as shown in FIG. 1, the raw meal to be thermally treated flows from the upper end of the heat exchanger 1 via the individual cyclones into the up to the second cyclone 1a. In a way not depicted here, the raw meal already preheated at this point flows into the rising branch 2 of the calcinator and is entrained there by the process gas and deacidified in the heat of the rotary kiln exhaust gases and additional firing in this part of the calcinator. Some plants have a swirl chamber 3, in which the process gases can burn out, in order to burn harmful exhaust gases oxidatively. After passing the swirl chamber 3, the calcined raw meal flows into the lowermost cyclone 1b, where it is separated and directed into the rotary kiln inlet chamber 5. The process gas is separated here from the calcined raw meal and rises up in the heat exchanger 1 for preheating the raw meal, where it flows counter to the raw meal. The raw meal introduced into the rotary kiln inlet chamber 5 then flows into the rotary kiln 6, where it is sintered into clinker. After the sintering, the clinker falls out of the rotary kiln 6 into the clinker cooler 8, where the freshly sintered clinker is rapidly quenched with the aid of cooling air. The cooling air heated up by the clinker in the clinker cooler 8 takes two paths. The first path leads as secondary air into the rotary kiln 6, whereas a second path leads via the tertiary air line 7 into the rising branch 2 of the calcinator.

According to the invention, it is thus provided that hot process gas is removed at the gas outlet of the calcinator, in order to generate electrical energy from it. In the present plant, the gas outlet is arranged at the lower end of the rising branch 4 of the calcinator, where shortly thereafter the calcined raw meal is separated from the process gas. In FIG. 1, this point is provided with reference numeral 10. An alternative or cumulative for the removal of hot process gas is the gas-side outlet of the first cyclone 1b in the direction of gas flow in the heat exchanger, which is provided with the reference numeral 11. The gas inlet of the second cyclone 1a or third cyclone, seen in the direction of gas flow, is used as the return location for the process gas removed and cooled in the steam boiler. The process gas removed and returned at the indicated points disturbs the process for producing cement only little or not at all. How the process gas is further handled is outlined in more detail in the next figure.

Figure 2:
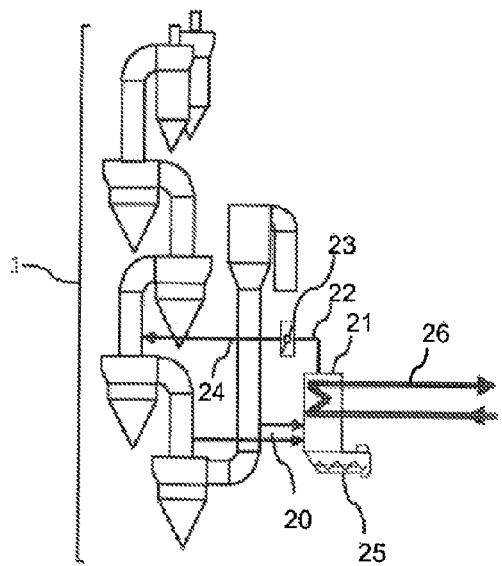
FIG. 2 shows a plant according to the invention for producing cement in a first refinement.

In FIG. 2 there is shown a detail from FIG. 1 with a depicted steam boiler 21, which is intended for the removal of heat from the hot process gas. According to the invention, it is provided that process gas is removed at location 10 and/or 11 according to FIG. 1 and is fed in each case via a process gas line 20 to a steam boiler 21. There, the heat of the process gas is used for heating up steam and the cooled process gas flows via a process gas line 22 to a control device 23 and from there via a process gas line 24 to the location of the return, which in FIG. 1 is provided with reference numeral 12. The steam to be heated enters the steam vessel 21 in steam line 26 and leaves it again by the steam line 26. Since the process gas removed is laden with dust, in a refinement of the invention it is provided that the dust is at least partially separated from the process gas in the steam boiler 21 and removed from the steam boiler 21 via the de-dusting device 25. The dust thus obtained can optionally be introduced into the rotary kiln inlet chamber 5 and/or into a cement mill.

Figure 3:
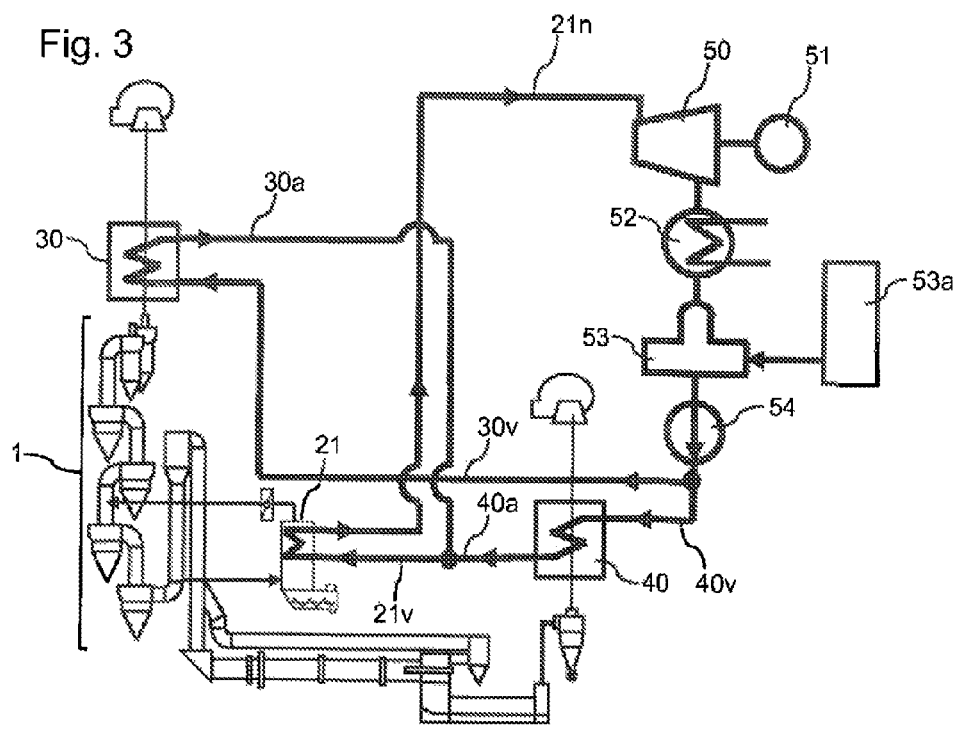
FIG. 3 shows a plant according to the invention for producing cement in a second refinement.

In FIG. 3, finally, there is shown an overall diagram of a refinement of a plant for producing cement together with a flow diagram that represents the overall removal of process gas and its use. The plant for producing cement depicted at the bottom left corresponds to the plant according to FIGS. 1 and 2. What is important here is the flow diagram for the use of the waste heat. In this circuit, low-calorific waste heat at a low temperature is obtained at the upper outlet of the heat exchanger 1 in a heat exchanger 30 of its own and also obtained in a further heat exchanger 40 at the end of the clinker cooler 8. Both the waste heat from the heat exchanger 1 and the waste heat from the clinker cooler 8 are combined via the steam lines 30a and 40a and the waste heat thus obtained is introduced as preheated flow 21v into the steam boiler 21, where the process gas removed superheats the steam in. The superheated steam is passed from the steam boiler via the steam line 21n into a turbine 50, which is connected to a generator for generating electrical energy. The steam is cooled in the condenser 52, passes through an extraction fan 53, which is coupled to a chemical treatment stage 53a, and is compressed by a pump 54. After leaving the pump 54, the cooled steam divides into two branches, wherein a first branch is passed as the flow 30v to the heat exchanger 30 for using the waste heat of the heat exchanger 1 and a second branch is passed as the flow 40v for using the waste heat of the clinker cooler 8. The circuit according to the invention has the effect that the steam for generating electrical energy is first preheated by the waste heat at a low temperature and heated up further by the process gas removed, so that the steam is superheated, and correspondingly carries a high amount of energy, which can be used in the turbine by expanding and condensing in a way known per se.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for using waste heat from a plant for producing cement,
   wherein heat of a process gas is used for heating water vapor via a steam boiler, and
   wherein the plant for producing cement has at least one calcinator and at least one heat exchanger, which comprises a sequence of cyclones, for heating raw meal,
   comprising the steps
   removing process gas from at least one of
   an outlet of the calcinator or
   a gas-side outlet of a first cyclone in a direction of gas flow in the heat exchanger
   and, after extraction of heat from the removed process gas in the steam boiler, returning cooled process gas to a second cyclone or third cyclone in the direction of gas flow in the heat exchanger.

2. The method as claimed in claim 1,
   further including the step of
   returning dust separated from the process gas in the steam boiler to at least one of a rotary kiln inlet chamber of a rotary kiln or a cement mill present in the plant.

3. The method as claimed in claim 1,
   further including the step of
   combining the heat from the process gas with waste heat that is removed downstream of the heat exchanger on a gas flow side of the plant or downstream of a clinker cooler on a material flow side of the plant.

4. The method as claimed in claim 1,
   further including the step of
   controlling an amount of the process gas removed, wherein a final control element is a gas controller in a cooled gas stream in a return line.

5. The method as claimed in claim 1,
   further including the step of
   de-dusting the process gas in the steam boiler.

6. A plant for producing cement comprising:
   at least one calcinator and at least one heat exchanger, which comprises a sequence of cyclones, for heating raw meal,
   a process gas removal point at at least one of an outlet of the calcinator or
   at a gas-side outlet of a first cyclone in a direction of gas flow in the heat exchanger,
   and
   the process gas removal point leads to a steam boiler, where heat of the process gas is used for heating water vapor via a heat exchanger, and
   a return line for the process gas to a second cyclone or third cyclone in the direction of gas flow in the heat exchanger.

7. The plant as claimed in claim 6,
   further comprising
   a return of the dust separated from the process gas in the boiler system to at least one of a rotary kiln inlet chamber of a rotary kiln or a cement mill present in the plant.

8. The plant as claimed in claim 7,
   further comprising
   water vapor flow in the steam boiler, which is preheated by waste heat that is removed downstream of the heat exchanger on a gas flow side of the plant and downstream of a clinker cooler on a material flow side of the plant.

9. The plant as claimed in claim 6,
   further comprising
   a control device for controlling an amount of process gas removed, wherein a final control element is a gas controller in a cooled gas stream in a return line.

10. The plant as claimed in claim 6,
    further comprising
    a device for de-dusting the process gas in the steam boiler.

11. A method for using the waste heat from a plant for producing cement, wherein heat of a process gas is used for heating water vapor via a steam boiler, and wherein the plant for producing cement has at least one calcinator and at least one heat exchanger comprising a sequence of cyclones, for heating raw meal, the method comprising the steps:
    removing the process gas from at least one of
    an outlet of the calcinator, and
    a gas-side outlet of a first cyclone in a direction of gas flow in the heat exchanger and,
    extracting heat from the process gas in a steam boiler, and thereafter
    returning the cooled process gas to one of a second cyclone and a third cyclone in the direction of gas flow in the heat exchanger.

12. The method as claimed in claim 11, including the further steps of:
    separating dust from the process gas in a system including the steam boiler,
    returning the separated dust from the process gas in the boiler system to at least one of the rotary kiln inlet chamber of a rotary kiln and a cement mill present in the plant.

13. The method as claimed in claim 11, further comprising the step:
    combining heat from the process gas with waste heat that is removed from at least one of downstream of the heat exchanger on a gas flow side and downstream of a clinker cooler on a material flow side.

14. The method as claimed in claim 11, further comprising the step:
    controlling the amount of the process gas removed, wherein a final control element is a gas controller in the cooled process gas stream in a return line.

15. The method as claimed in claim 11, further comprising the step:
    de-dusting the process gas in the steam boiler.

* * * * *